Patented June 18, 1935

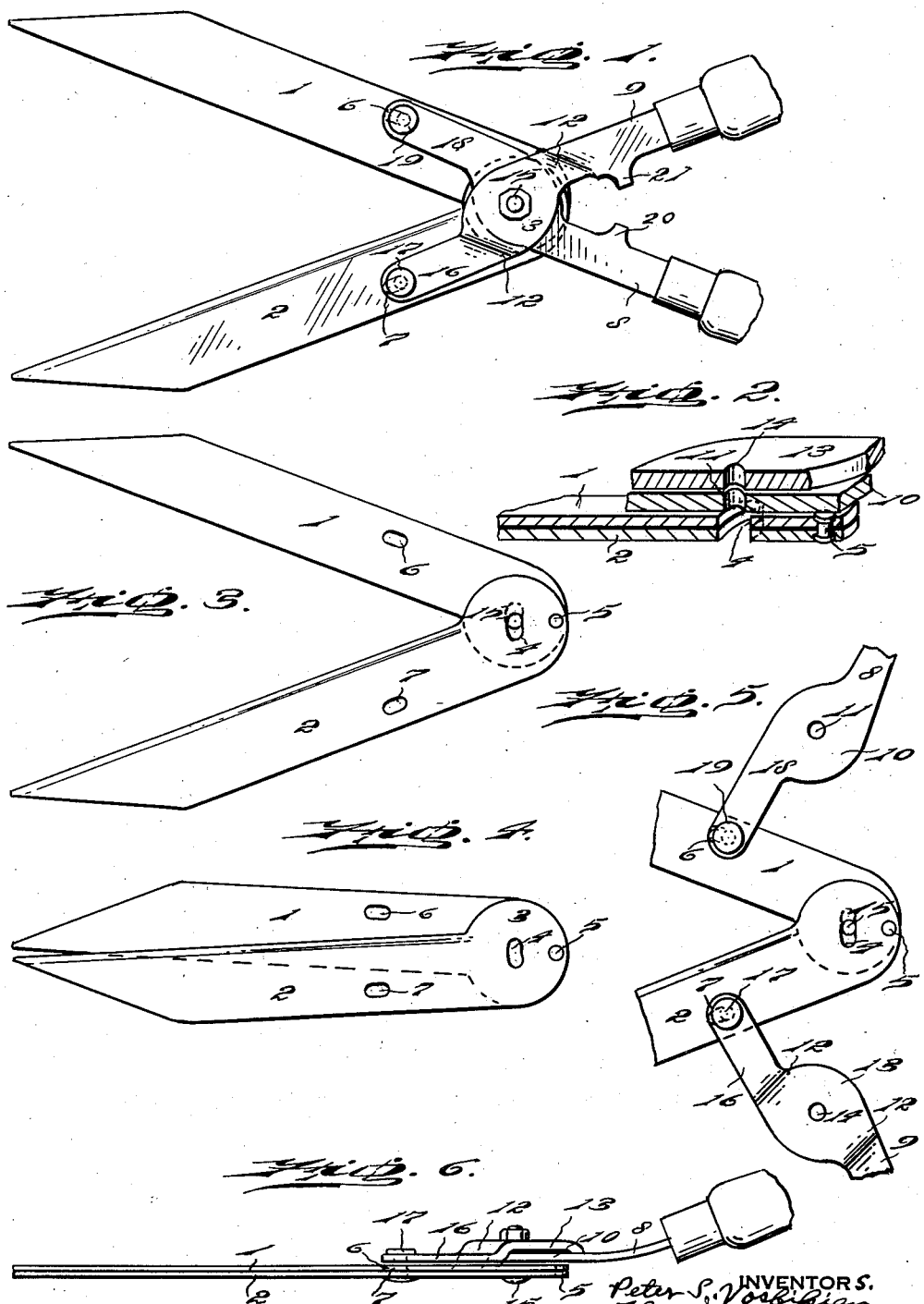

2,005,694

UNITED STATES PATENT OFFICE 2,005,694

HEDGE SHEARS

Peter S. Vosbikian and Thomas S. Vosbikian, Philadelphia, Pa., assignors to Keystone Tool Manufacturing Company, a corporation of Pennsylvania Application February 6, 1934, Serial No. 709,907

3 Claims. (Cl. 30—11)

The object of our invention is to devise a novel construction and arrangement of hedge shears wherein the cutting blades are secured to the handle receiving portions in a novel manner and the cutting blades are so constructed that they can be made by a stamping or forging operation with a minimum of material.

A further object of the invention is to connect the handle receiving portions with the blades in such a manner that an increased leverage is obtained and, if desired, relative longitudinal movement of one blade with the other so that a better cutting action is obtained.

A further object of the invention is to have the handle receiving portions connected with the blades in advance of their pivotal connection with the blades.

With the above and other objects in view, as will hereinafter more clearly appear, our invention comprehends a novel construction and arrangement of hedge shears.

It further comprehends a novel construction and arrangement of hedge shears wherein the blades are connected with the handle receiving portions in such a manner that such handle receiving portions have a leverage on the blades intermediate their ends and in advance of the pivotal connection of the butting blades.

Our invention further comprehends novel hedge shears wherein the cutting blades are pivotally connected and have in advance of the pivotal connection a cam slot and each of said blades having also intermediate their ends openings or slots adapted to be connected with arms extending from the handle receiving portions of the hedge shears so that a leverage is exerted intermediate the ends of the cutting blades and in advance of their pivotal connection.

Other novel features of construction and advantage will hereinafter appear in the detailed description and the appended claims.

For the purpose of illustrating our invention, we have shown in the accompanying drawing a preferred embodiment of it, which, in practice, will give satisfactory and reliable results. It is, however, to be understood that this embodiment is typical only and the various instrumentalities of which our invention consists can be variously arranged and organized, and the invention is not limited to the exact arrangement and organization of these instrumentalities as herein set forth.

Figure 1 is a plan view of hedge shears embodying our invention.

Figure 2 is a sectional view, showing more in detail, the manner in which certain of the parts cooperate.

Figure 3 is a plan view of the cutting blades in detached and open position.

Figure 4 is a plan view of the cutting blades in their closed position.

Figure 5 is a plan view of a portion of the hedge shears with the handle receiving portions connected with the blades being opened outwardly to more clearly show certain details of the construction.

Figure 6 is a side elevation of the hedge shears in assembled condition.

Similar numerals of reference indicate corresponding parts.

Referring to the drawing:

1 and 2 designate the cutting blades, each of which is provided with a cutting edge in the usual manner, and at their rear ends they are each in the form of a disc 3 having registering slots 4 which are preferably curved forming a cam slot, as is best shown in Figure 4. The blades 1 and 2 are pivoted together at their rear ends by means of the pivot member 5 which may be a rivet pin or any other desired means for providing a pivotal connection at the rear end of the cutting blades. The blade 1 is provided with an elongated slot 6 extending longitudinally of its blade, and the blade 2 is provided with a similar slot 7 which extends longitudinally of its blade.

8 and 9 designate, respectively, the handle receiving portions of the hedge shears and these handle receiving portions are connected with the blades in a novel manner. The handle receiving portion 8 is provided with a rounded or disc shaped bearing portion 10 having an aperture 11. The corresponding portion of the handle receiving portion 9 is offset as at 12 to provide a rounded or disc shaped bearing portion 13 having an aperture 14. The handle receiving portions 8 and 9 are connected with the cutting blades 1 and 2 by means of a fastening device 15, which, as illustrated, is in the form of a screw passing through the cam slots 4 and the apertures 11 and 14 and provided with a nut, bearing against the bearing portion 13 of the upper handle receiving portion of the hedge shears. The bearing portion 10 of the handle receiving portion 8 engages the bearing portion formed at the rear end of the cutting blade 2 and the bearing portion 13 which engages the bearing portion 10 is offset as shown so that a very compact construction is provided and the lower handle receiving portion can swing beneath the upper handle receiving portion. The handle receiving portion 9 has a forwardly extending arm 16 having a pivot pin 17 which passes through the slot 7 and is of less diameter than the length of such slot. In a similar manner the handle receiving hedge portion 8 is provided with a forwardly projecting arm 18 having a pivot pin 19 extending through the slot 6 of the cutting blade 1, and of less diameter than the length of such slot. These pivot pins 17 and 19 are preferably in the form of rivets. Each handle receiving portion is adapted at its outer end to receive a grasping handle of any desired or conventional type.

The handle portion 8 is provided with a lug 20 and in a similar manner the handle receiving portion 9 is provided with a lug 21. These lugs 20 and 21 serve as stops to limit the movement of the cutting blades 1 and 2. It will be apparent that the cutting blades 1 and 2 are of the same construction and can be stamped out of sheet metal at a minimum cost.

It will be apparent from Figures 3, 4 and 5, that in the embodiment seen in Figures 1 to 6 inclusive, the pivotal point of the blades, as at 5, is in rear of the fastening device 15 so that the blades swing on their pivotal point 5 and at the same time due to the pin and slot connection with the handle receiving portions or shanks of the hedge shears, a relative longitudinal movement of the blades and handle receiving portions is permitted.

It will be apparent that as the blades close, the fastening devices, such as the rivets 17 and 19, move forwardly in their respective cam slots 6 and 7 so that an increased leverage is provided in advance of the pivot or fulcrum 5 on which the blades turn.

It will thus be apparent that due to this construction the shears can be operated with less effort than the conventional type of shears where the shanks are not connected with the blades in advance of their pivotal connection.

It will now be apparent that we have devised new and useful hedge shears which embody the features of advantage enumerated as desirable in the statement of the invention and the above description, and while we have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described our invention what we claim as new and desire to secure by Letters Patent, is:—

1. Hedge shears, comprising handle receiving shanks, having cooperating bearing portions, a pair of cutting blades pivotally connected with each other at their rear ends to form a fixed pivot, a fastening device passing through said bearing portions and the rear ends of said blades in advance of their pivotal connection, said blades having cam slots through which said fastening device passes to form a floating pivot, and each of said bearing portions having a forward extension pivotally connected with a juxtaposed blade intermediate the ends of such blade.

2. Hedge shears, comprising handle receiving shanks, having cooperating bearing portions, a pair of cutting blades pivotally connected with each other at their rear ends, a fastening device passing through said bearing portions and the rear ends of said blades in advance of their pivotal connection, and each of said bearing portions having a forward extension having a pin and slot connection with a juxtaposed blade intermediate the free ends of such blade and said fastening device.

3. Hedge shears, comprising handle receiving shanks, having cooperating bearing portions, a pair of cutting blades pivotally connected with each other at their rear ends, a fastening device passing through said bearing portions and the rear ends of said blades in advance of their pivotal connection, said blades having cam slots of greater length than the diameter of said fastening device and through which said fastening device passes, and each of said bearing portions having a forward extension having a pin and slot connection with a juxtaposed blade intermediate the ends of such blade.

PETER S. VOSBIKIAN.
THOMAS S. VOSBIKIAN.